United States Patent
Hively et al.

Patent Number: 5,815,413
Date of Patent: Sep. 29, 1998

[54] INTEGRATED METHOD FOR CHAOTIC TIME SERIES ANALYSIS

[75] Inventors: Lee M. Hively, Philadelphia; Esmond G. Ng, Concord, both of Tenn.

[73] Assignee: Lockheed Martin Energy Research Corporation, Oak Ridge, Tenn.

[21] Appl. No.: 853,226

[22] Filed: May 8, 1997

[51] Int. Cl.$^6$ .................................................. A61B 5/00
[52] U.S. Cl. ...................... 364/574; 702/190; 702/191; 600/544; 600/545
[58] Field of Search ..................... 364/572, 573, 364/574, 280, 283.1, 286, 286.2, 551.01, 940, 948.2; 707/102, 200, 500, 530; 600/544, 545, 546; 126/702, 600, 621

[56] References Cited

U.S. PATENT DOCUMENTS

| | | | |
|---|---|---|---|
| 5,311,876 | 5/1994 | Olsen et al. | 600/544 |
| 5,349,962 | 9/1994 | Lockard et al. | 600/545 |
| 5,392,788 | 2/1995 | Hudspeth | 600/544 |
| 5,511,537 | 4/1996 | Hively | 126/702 |
| 5,626,145 | 5/1997 | Clapp et al. | 600/544 |

OTHER PUBLICATIONS

A.M. Fraser and H. L. Swinney, "Independent Coordinates for Strange Attractors from Mutual Information," *Phys. Rev A* 33, 1134–1140 (1986).

R.C. Watt and S.R. Hameroff, "Phase Space Analysis of Human EEG during General Anesthesia," *Ann. N.Y. Acad. Sci.* 504, 286–288 (1987).

G.A. Korn and T.M. Korn, *Mathematical Handbook for Scientists and Engineers*, McGraw Hill Book Company (second edition) 1968 (Section 19.6–19.7).

M. Abramowitz and I. A. Stegun (ed.), *Handbook of Mathematical Functions*, U.S. Government Printing Office (Washington, D.C.) 1964 (Equation 26.4.11).

H.D.I. Abarbanel, R. Brown, J.J. Sidorowich, and L. Sh. Tsimring, "The Analysis of Observed Chaotic Data in Physical Systems," *Rev. Mod. Phys.* 65, 1331–1392 (1993).

P. Grassberger, T. Schreiber, C. Schaffrath, "Nonlinear Time Sequence Analysis," *Int. J. Bifur. Chaos* 3, 521–547 (1991).

D.S. Broomhead and G.P. King, "Extracting Qualitative Dynamics from Experimental Data," *Physica D* 20, 217–236 (1986).

*Primary Examiner*—James P. Trammel
*Assistant Examiner*—Bryan Bui
*Attorney, Agent, or Firm*—J. Kenneth Davis

[57] ABSTRACT

Methods and apparatus for automatically detecting differences between similar but different states in a nonlinear process monitor nonlinear data. Steps include: acquiring the data; digitizing the data; obtaining nonlinear measures of the data via chaotic time series analysis; obtaining time serial trends in the nonlinear measures; and determining by comparison whether differences between similar but different states are indicated.

20 Claims, 6 Drawing Sheets

INTEGRATED METHOD FOR CHAOTIC TIME SERIES ANALYSIS

The United States Government has rights in this invention pursuant to contract no. DE-AC05-96OR22464 between the United States Department of Energy and Lockheed Martin Energy Research Corporation.

FIELD OF THE INVENTION

The present invention relates to methods for analyzing nonlinear data from diverse sources, including but not limited to electroencephalogram and magnetoencephalogram brain wave data, electrocardiogram data, and motor current data from processes such as metal machining operations and electrically-driven pumps.

CROSS-REFERENCE TO RELATED APPLICATIONS

The following U.S. patent applications describe related inventions, Epileptic Seizure Detection by Nonlinear Methods, Ser. No. 08/619,024, filed Mar. 20, 1996; Epileptic Seizure Prediction by Nonlinear Methods, Ser. No. 08/619,030, filed Mar. 20, 1996, and Method and Apparatus for Extraction of Low-Frequency Artifacts from Brain Waves for Alertness Detection, Ser. No. 08/619,031, filed Mar. 20, 1996. The entire disclosure of each of the above identified patent applications are hereby incorporated by reference.

BACKGROUND OF THE INVENTION

A deviation from normal process conditions can indicate performance degradation or the onset of imminent failure. Real- or near-real-time monitoring of the process condition can detect this deviation in data from current, voltage, acceleration, acoustic emission, pressure, power, and other measurable quantities. Prompt response to a significant deviation can help to maintain optimal performance and can avert disastrous failure.

The theory of nonlinear dynamics provides a basis for understanding and potentially controlling many complex physical and engineering systems. For example, an extensive literature exists for nonlinear dynamics in the brain and related work as cited in U.S. patent application Ser. No. 08/619,024, U.S. patent application Ser. No. 08/619,030, and U.S. patent application Serial No. 08/619,031 hereinabove incorporated by reference. Other documents listed below refer to earlier work using linear and nonlinear methods of analysis. Numbers in parentheses within the text of the disclosure hereinafter refer to documents as listed below.

DOCUMENT LIST

1. C. E. Shannon and W. Weaver, *The Mathematical Theory of Communication*, University of Illinois Press, Urbana, 1949.
2. A. M. Fraser and H. L. Swinney, "Independent Coordinates for Strange Attractors from Mutual Information," *Phys. Rev A* 33, 1134–1140 (1986).
3. R. C. Watt and S. R. Hameroff, "Phase Space Analysis of Human EEG during General Anesthesia," *Ann. N. Y. Acad Sci.* 504, 286–288 (1987).
4. R. C. Watt and S. R. Hameroff, "Phase Space Electroencephalography (EEG): a New Mode of Intraoperative EEG Analysis," *Int. J Clin. Monit. Comput.* 5, 3–13 (1988).
5. G. A. Korn and T. M. Korn, *Mathematical Handbook for Scientists and Engineers*, McGraw Hill Book Company (second edition) 1968 (Section 19.6–7).
6. M. Abramowitz and I. A. Stegun (ed.), *Handbook of Mathematical Functions*, U.S. Government Printing Office (Washington, D.C.) 1964 (Equation 26.4.11).
7. H. D. I. Abarbanel, R. Brown, J. J. Sidorowich, and L. Sh. Tsimring, "The Analysis of Observed Chaotic Data in Physical Systems," *Rev. Mod. Phys.* 65, 1331–1392 (1993).
8. P. Grassberger, T. Schreiber, C. Schaffrath, "Nonlinear Time Sequence Analysis," *Int. J Bifur. Chaos* 3, 521–547 (1991).
9. N. H. Packard, J. P. Crutchfield, J. D. Farmer, and R. S. Shaw, *Phys. Rev. Lett.* 45, 712 (1980)
10. F. Takens, "Detecting Strange Attractors in Turbulence," in *Lecture Notes in Mathematics*, ed. by D. A. Rand and L. -S. Young, Springer, Berlin, 1981, pp. 366.
11. D. S. Broomhead and G. P. King, "Extracting Qualitative Dynamics from Experimental Data," *Physica D* 20, 217–236 (1986).

OBJECTS OF THE INVENTION

It is an object of the present invention to provide new and improved methods and apparatus for discriminating between similar but different states in a nonlinear process.

It is a further object of the present invention to provide new and improved methods for nonlinear analysis of experimental time serial data.

The method obtains a phase-space (PS) representation of the process, which in turn is converted into a probability density function (PDF). Condition change is monitored by comparing two PS-PDFs via a $\chi^2$ statistical measure. One example application involves monitoring of brain waves to distinguish various states in an epileptic patient. A second example distinguishes different drilling conditions from spindle motor current data. A third example distinguishes balanced and unbalanced pumping conditions from electrical power data.

Further and other objects of the present invention will become apparent from the description contained herein.

SUMMARY OF THE INVENTION

In accordance with one aspect of the present invention, the foregoing and other objects are achieved by a method for automatically discriminating between similar but different states in a nonlinear process which comprises the steps of: operating a data provision means selected from the group consisting of data storage means and data acquisition means to provide at least one channel of nonlinear data, called e-data; separating the e-data into artifact data, called f-data, and artifact-free data, called g-data, while preventing phase distortions in the data; processing g-data through a filter to produce a filtered nonlinear measure to at least one type of data selected from the group consisting of e-data, f-data, g-data, and h-data to provide at least one time serial sequence of nonlinear measures from which at least one indicative trend selected from the group consisting of abrupt increases and abrupt decreases can be determined; comparing at least one indicative trend with at least one known discriminating indicator; determining from the comparison whether differences between similar but different states are indicated; and providing notification whether differences between similar but different states are indicated, the separating step, the processing step, the applying step, the comparing step, and the determining step being accomplishable in one integrated sequence of computer analyses.

In accordance with a second aspect of the present invention, the foregoing and other objects are achieved by an apparatus for automatically discriminating between similar but different states in a nonlinear process which comprises: data provision means for providing at least one channel of nonlinear data, called e-data, the data provision means being selected from the group consisting of data storage means and data acquisition means; separation means for separating the e-data into artifact data, called f-data, and artifact-free data, called g-data, while preventing phase distortions in the data, communicably connected to the data provision means; filter means for filtering g-data to produce a filtered version of g-data, called h-data, communicably connected to the separation means; application means for applying at least one nonlinear measure to at least one type of data selected from the group consisting of e-data, f-data, g-data, and h-data to provide at least one time serial sequence of nonlinear measures, from which at least one indicative trend selected from the group consisting of abrupt increases and abrupt decreases can be determined, communicably connected to the filter means; comparison means for comparing at least one indicative trend with at least one known discriminating indicator, communicably connected to the application means; determination means for determining from the comparison whether differences between similar but different states are indicated, communicably connected to the comparison means; and notification means for providing notification whether differences between similar but different states are indicated, communicably connected to the determination means, the separation means, the low pass filter means, the application means, the comparison means, and the determination means being operable in one integrated sequence of computer analyses.

In accordance with a third aspect of the present invention, the foregoing and other objects are achieved by a method for automatically discriminating between similar but different states in a nonlinear process which comprises the steps of: operating a data provision means selected from the group consisting of data storage means and data acquisition means to provide at least one channel of nonlinear data, called e-data; separating the e-data into artifact data, called f-data, and artifact-free data, called g-data, while preventing phase distortions in the data; processing g-data through a filter to produce a filtered version of g-data, called h-data; applying the lag derived from the first minimum in the mutual information function to create a d-dimensional probability density function which forms a high-dimensional topology for at least one type of data selected from the group consisting of e-data, f-data, g-data, and h-data whereby at least one indicative trend can be determined; comparing at least one indicative trend with at least one known discriminating indicator; determining from the comparison whether differences between similar but different states are indicated; and providing notification whether differences between similar but different states are indicated, the separating step, the processing step, the applying step, the comparing step, and the determining step being accomplishable in one integrated sequence of computer analyses.

In accordance with a fourth aspect of the present invention, the foregoing and other objects are achieved by a method for automatically discriminating between similar but different states in a nonlinear process which comprises the steps of: operating a data provision means selected from the group consisting of data storage means and data acquisition means to provide at least one channel of nonlinear data, called e-data; separating the e-data into artifact data, called f-data, and artifact-free data, called g-data, while preventing phase distortions in the data; processing g-data through a filter to produce a filtered version of g-data, called h-data; applying the lag derived from the first minimum in the mutual information function to create a d-dimensional probability density function which forms a high-dimensional topology for at least one type of data selected from the group consisting of e-data, f-data, g-data, and h-data whereby at least one indicative trend can be determined; generating a key from the set of indices of each bin in the multidimensional probability density function; representing occupied bins from the same class by a linked list to provide a reduction in the number of elements to be stored in the manner known as hashing whereby at least one hashed discriminating trend can be determined; comparing at least one indicative trend with at least one known discriminating indicator; determining from the comparison whether differences between similar but different states are indicated; and providing notification whether differences between similar but different states are indicated, the discriminating indicator being hashed, and the separating step, the processing step, the applying step, the generating step, the representing step, the comparing step, and the determining step being accomplishable in one integrated sequence of computer analyses.

In accordance with a fifth aspect of the present invention, the foregoing and other objects are achieved by an apparatus for automatically discriminating between similar but different states in a nonlinear process which comprises: data provision means for providing at least one channel of nonlinear data, called e-data, said data provision means being selected from the group consisting of data storage means and data acquisition means; separation means for separating the e-data into artifact data, called f-data, and artifact-free data, called g-data, while preventing phase distortions in the data, communicably connected to the data provision means; filter means for filtering g-data to produce a filtered version of g-data, called h-data, communicably connected to the separation means; application means for applying the lag derived from the first minimum in the mutual information function to create a d-dimensional probability density function which forms a high-dimensional topology for at least one type of data selected from the group consisting of e-data, f-data, g-data, and h-data, whereby at least one indicative trend can be determined, communicably connected to the filter means; comparison means for comparing at least one indicative trend with at least one known discriminating indicator, communicably connected to the application means; determination means for determining from the comparison whether differences between similar but different states are indicated, communicably connected to the comparison means; and notification means for providing notification whether differences between similar but different states are indicated, communicably connected to the determination means, the discriminating indicator being hashed and the separation means, the filter means, the application means, the comparison means, and the determination means being operable in one integrated sequence of computer analyses.

In accordance with a sixth aspect of the present invention, the foregoing and other objects are achieved by an apparatus for automatically discriminating between similar but different states in a nonlinear process which comprises: data provision means for providing at least one channel of nonlinear data, called e-data, the data provision means being selected from the group consisting of data storage means and data acquisition means; separation means for separating the e-data into artifact data, called f-data, and artifact-free data, called g-data, while preventing phase distortions in the data, communicably connected to the data provision means; filter means for filtering g-data to produce a filtered version of g-data, called h-data, communicably connected to the separation means; application means for applying the lag derived from the first minimum in the mutual information function to create a d-dimensional probability density function which forms a high-dimensional topology for at least one type of data selected from the group consisting of e-data, f-data, g-data, and h-data whereby at least one indicative trend can be determined, communicably connected to the filter means; generation means for generating a key from the set of indices of each bin in the multidimensional probability density function, communicably connected to the application means; representation means for representing occupied bins from the same class by a linked list to provide a reduction in the number of elements to be stored in the manner known as hashing, whereby at least one hashed indicative trend can be determined, communicably connected to the generation means; comparison means for comparing at least one indicative trend with at least one known discriminating indicator, communicably connected to the representation means; determination means for determining from the comparison whether differences between similar but different states are indicated, communicably connected to the comparison means; and notification means for providing notification whether differences between similar but different states are indicated, communicably connected to the determination means, the discriminating indicator being hashed and the separation means, the filter means, the application means, the generation means, the representation means, the comparison means, and the determination means being operable in o integrated sequence of computer analyses.

Figure 1A:
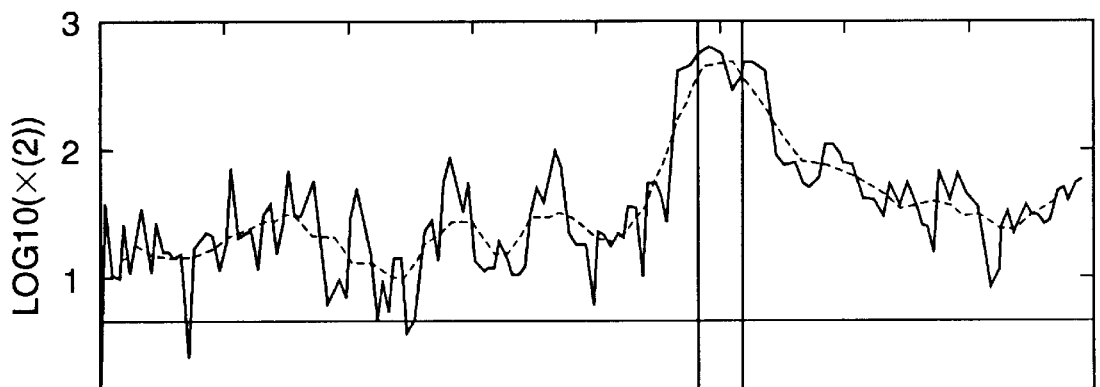
FIGS. 1a, 1b, and 1c are $X_i$ comparisons of base-case and cutset dynamics for an EEG dataset via the (a)two-, (b) three-, and (c) four-dimensional phase-space probability density function method.

For a better understanding of the present invention, together with other and further objects, advantages and capabilities thereof, reference is made to the following disclosure and appended claims in connection with the above-described drawings.

DETAILED DESCRIPTION OF THE INVENTION

The present invention is distinguished from the inventions described in U.S. patent application Ser. No. 08/619,024, U.S. patent application Ser. No. 08/619,030, and U.S. patent application Ser. No. 08/619,031 which have been incorporated by reference above. The present invention provides both integrated methods and integrated apparatus for analyzing chaotic time series data which can be operated independent of human intervention in one integrated sequence of computer analyses to discriminate or distinguish states automatically. The process can function without human selection of data types or human selection of process steps. The previous methods and apparatus, described in U.S. patent application Ser. No. 08/619,024, U.S. patent application Ser. No. 08/619,030, and U.S. patent application Ser. No. 08/619,031 depend upon a group of research-type non-linear mathematical analytical tools with human intervention to interpret or select data or process steps before subsequent steps can be taken.

Although in the specific examples cited herein g-data is processed through a low-pass filter to separate a low-pass-filtered version of g-data called h-data, from high frequency data, it must also be noted that g-data can be processed through a high-pass filter to separate the low frequency data from high frequency filtered data in an alternate embodiment of the invention.

The present invention also adds to the previous nonlinear methods a new set of method steps that is based on the phase-space representation, which Watt and Hameroff (3–4) showed to be a useful tool for brain dynamics. In addition, a novel hashing technique is incorporated to improve the phase-space probability distribution function (PDF), and to reduce the memory requirement for computers performing this type of analysis. For example, without the hashing technique, the memory requirement for 5-dimensional PDFs is $5 \times 50^5 = 625$ million elements in the array, which is only available in the world's largest, high-performance computers. The memory requirement is $2 \times 50^6 = 31$ billion elements for 6-dimensional PDFs. The hashing method reduces the memory storage requirement for the 5-dimensional case by a factor of 380, allowing this case to run easily on modest scientific workstation-class computers. Moreover, the hashing technique reduces the execution time for the 4-dimensional PDF by a factor of 31, and reduces the array storage requirement by a factor of 9.

PHASE-SPACE CONSTRUCTION

Condition monitoring begins with experimental data that capture the process dynamics. This data must be acquired or retrieved from data storage before chaotic time series analysis can be applied. Data storage means may include but not be limited to magnetic media such as magnetic tape, computer disks or diskettes, and optical media such as CD ROM disks. Data Acquisition means may include but not be limited to electrocenpalogram, magnetoencephalogram, electrocardiogram, accelerometer, ammeter, voltmeter, ohmmeter, audiometer, light meter, pressure meter, thermometer, and the like.

The implementation of this method typically requires at least 10,000 data points with at least 5 active bits of digitization for a robust statistical representation. The time-serial data ($x_i$) occur at equally spaced times ($t_i$).

From the experimental data, a nonlinear statistical parameter, called the mutual information function (MIF) is extracted, which is a nonlinear analog of the auto-correlation function. MIF was formulated by Shannon and Weaver (1) and was applied to time series by Fraser and Swinney (2). MIF measures the average information (in bits) that can be inferred from one measurement about a second measurement, and is a function of the time delay between measurements. The first minimum in the MIF indicates the shortest time lag ($\lambda=t_i-t_j$) when the signal, $x(t_i)$, is decorrelated from $x(t_j)$. A minimum is defined as two successive decreases in $x(t)$, followed by two successive increases in $x(t)$. To capture the process dynamics, the adequacy of the sampling rate is measured as $\lambda \geq 10$ timesteps and the average number of timesteps per cycle as $\geq 5$.

Next, the time-serial data is converted into a geometric (or phase-space) representation (3–4). A two-dimensional version of this phase-space plot involves construction of lines between the sequence of points $(x_i, x_{i+L})$. The value for the index (i) runs through the dataset, and the lag ($L = \lambda$) comes from the first minimum in the mutual information function, as described in the previous paragraph. The resulting geometric figure is very complex, showing topological regions preferred and avoided by the dynamics. A three-dimensional diagram involves construction of lines between the sequence of points $(x_i, x_{i+L}, x_{i+2L})$ The lag ( L ) also comes from the first minimum in the MIF (i.e., $L=\lambda/2$). The general case involves a d-dimensional point of the form, $y(i)=[x_i, x_{i+L}, \ldots, x_{i+(d-1)L}]$. The lag is $L=INT[0.5+\lambda/(d-1)]$, where INT( . . . ) denotes conversion of a decimal number to the next smaller integer (e.g., 3.14 becomes 3). The highest dimensionality (d) for this representation occurs when $INT[0.5+\lambda/(d-1)]=1$. The general geometric representation requires that the sequence of points be connected to form a d-dimensional topology, then subsequently compared to a companion phase-space diagram to determine a condition change. A quantitative visual comparison of phase-space representations is very difficult in two dimensions, and is essentially impossible in three or higher dimensions.

CONSTRUCTION OF THE PHASE-SPACE PROBABILITY DENSITY FUNCTION

Visualization of the three- (and higher-) dimensional phase-space is difficult. Consequently, the d-dimensional vector, y(i), is discretized into N equally spaced bins in each coordinate direction. Specifically, each component of y(i) is converted into an integer, $J=INT[N(x_i-x_n)/(x_x-x_n)]+1$, where INT is the integer function (defined above) and $1 \leq J \leq N$. The symbols, $x_x$ and $x_n$, denote the maximum and minimum in the $x_i$ values over the whole dataset, respectively. The number of bins (N) must be chosen to be consistent with the data precision (e.g., for 12-bits of precision, N must be less than 4096). A value of N=50 adequately represents the dynamics for the example cases.

From this discretized version of the phase space, a probability density function (PDF) is constructed by incrementing the population of the appropriate d-dimensional bin by one, corresponding to the discretized coordinates of each y(i). This PDF does not have information about the connectivity between y(i) and y(i+1), which the phase space diagram does display. However, as noted above, the phase space diagram is complex and difficult to visualize in three or more dimensions. Moreover, high (low) PDF densities indicate domains that the process visits frequently (seldom). Thus, the topology of the PDF is equivalent to a phase-space diagram.

The subsequent discussion uses "PDFs" to indicate use of the above methodology for constructing two-, three-, and four-dimensional probability density functions. First, PDFs are constructed for a base case, with the notation: $P_2$=two-dimensional PDF, $P_3$=three-dimensional PDF, $P_4$=four-dimensional PDF. PDFs are obtained for an unknown condition from the same process, with the notation: $Q_2$=two-dimensional PDF, $Q_3$=three-dimensional PDF, $Q_4$=four-dimensional PDF.

COMPARISON OF TWO PHASE-SPACE PROBABILITY DENSITY FUNCTIONS

Next, PDFs are compared for the unknown process state $(Q_i)$ to the corresponding basecase PDFs $(P_i)$. The occurrence frequency in each bin of $P_i$ is scaled so that the total population (sum over all the bins) is the same as that in the total population of the corresponding $Q_i$. Thus, the population in each bin of $P_i$ is scaled to $cP_i$ where the scale factor is c=(total population of $Q_i$)/(total population in $P_i$). The base-case and unknown-case PDFs is compared by a $\chi^2$ statistic:

$$\chi_2^2 = \sum_{i,j=1}^{N} [Q_2(i,j) - P_2(i,j)]^2/P_2(i,j) + (Q_{2s} - P_{2s})^2/P_{2s} \quad \text{(Eq. 1)}$$

$$\chi_3^2 = \sum_{i,j,k=1}^{N} [Q_3(i,j,k) - P_3(i,j,k)]^2/P_3(i,j,k) + (Q_{3s} - P_{3s})^2/P_{3s} \quad \text{(Eq. 2)}$$

$$\chi_4^2 = \sum_{i,j,k,l=1}^{N} [Q_4(i,j,k,l) - P_4(i,j,k,l)]^2/P_4(i,j,k,l) + (Q_{4s} - P_{4s})^2/P_{4s} \quad \text{(Eq. 3)}$$

The first term in each equation is used if the denominator is >10. A bin population of $\leq 10$ causes significant inaccuracy in $\chi_i^2$ (5), in which case, we pool such sparse populations into one (or more) accumulation bin(s) for the base case $(P_{is})$ and for the cutset $(Q_{is})$ We subsequently determine the contribution of these sparse populations to $\chi_i^2$ via the second term in each equation. We further note that a normal distribution approximates $\chi_i^2$ when the number of bins is large (>30), for which the normalization is $X_i=(\chi_i^2-\nu)/(2\nu)^{1/2}$, with $\nu$=number of bins contributing to the sum, minus one (6).

A second measure is also used for comparative purposes based on the entropy of the two-,three-, and four-dimensional PDFs:

$$e_2 = -(2 \ln N)^{-1} \sum_{i,j=1}^{N} P_2(i,j) \ln[P_2(i,j)] \quad \text{(Eq. 4)}$$

$$e_3 = -(2 \ln N)^{-1} \sum_{i,j,k=1}^{N} P_3(i,j,k) \ln[P_3(i,j,k)] \quad \text{(Eq. 5)}$$

$$e_4 = -(2 \ln N)^{-1} \sum_{i,j,k,l=1}^{N} P_4(i,j,k,l) \ln[P_4(i,j,k,l)] \quad \text{(Eq. 6)}$$

The first factor in Equations 4–6 normalizes the entropy $(e_i)$ to have a range between zero and unity. PDF bins with zero population make no contribution to the sum because z ln(z)→0 in the limit of z→0.

EXAMPLE I

Results For Brain Wave Data

This example began with sixteen channels of human bipolar-montage electroencephalogram (EEG) data in analog form on VHS tapes. 23–45 minutes of data were converted to digital form with 12-bit precision at a sampling rate of 512 hertz. Four epochs of data were examined: non-seizure, transition from non-seizure to seizure (transition), epileptic seizure, and post-seizure. Channel 13 which was closest to the patients' right eye, was chosen for analysis as a demonstration of the zero-phase, quadratic filtering method for removing low-frequency EEG artifacts due to eye blinks and muscle twitches.

Figure 1B:
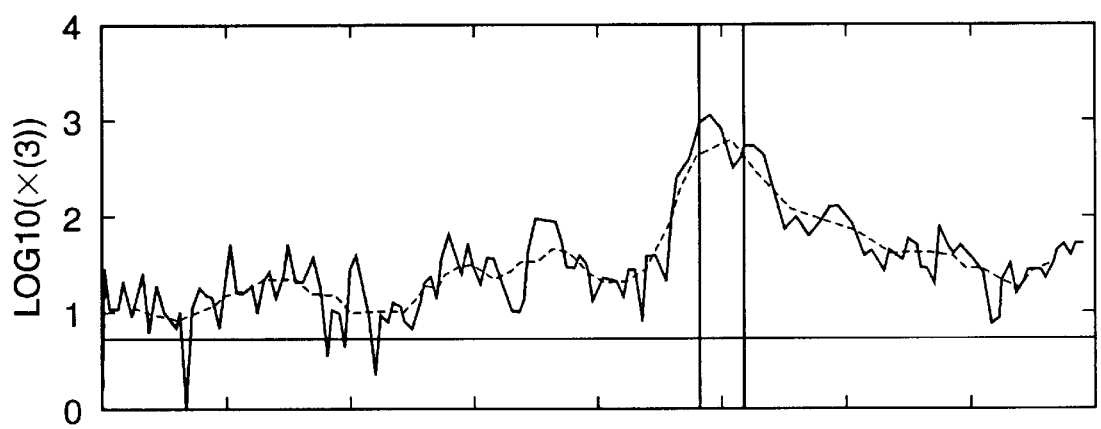
Figure 1C:
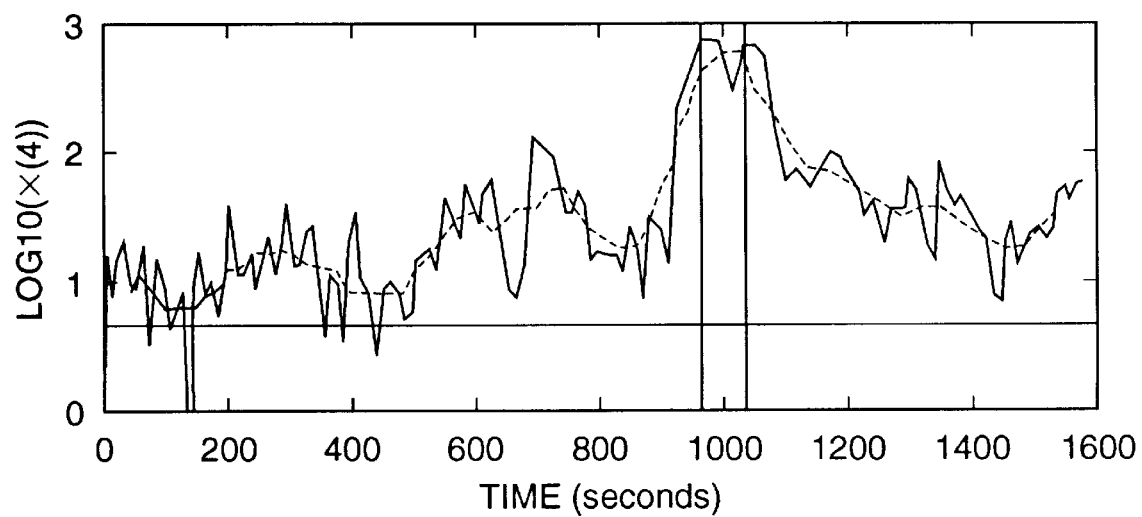

The above methodology was applied to obtain PDFs for brain activity. The value of the first minimum ($\lambda$) in the mutual information function typically varies between 10–50 timesteps during the non-seizure period, so $\lambda$ is fixed at the value for the base case (the first 200 seconds of data) for all subsequent analysis. FIG. 1 shows a $\chi^2$ comparison of the base case to cutsets (20-second data segments, having a 10-second overlap with the previous cutset) for two-, three-, and four-dimensional PDFs. The plots show $X_i$ (solid curve) for each cutset, along with a running average of $X_i$ (dashed curve) over eleven consecutive cutsets, plotted at the central (sixth) point of the averaging window. $X_i$ is maximum during the clinical seizure, which occurs from 966–1035 seconds (between the two vertical lines in each subplot on either side of 1000 seconds). The horizontal line across each subplot lies at a gaussian probability of $P(X_i)=0.999999$, corresponding to a probability of $10^{-6}$ that the PDFs are not different (at $X_i=4.75$). Most $X_i$ values lie above 4.75, indicating high variability in brain dynamics, even in the non-seizure state. $X_i$ begins a monotonic rise to the seizure peak, beginning at 930 seconds, consistent with the pre-seizure activity in the phase-space PDFs (not shown). Large excursions occur in $X_i$ beginning at 550 seconds ($X_i>47.5$). $X_i$ remains above 4.75 after 520 seconds for $X_2$, and after 460 s for $X_3$ and $X_4$. Beginning at 500 seconds, the average values of $X_3$ and $X_4$ remain above the non-seizure average. These latter features are interpreted as seizure predictors. Thus, $X_2$ is sufficient to detect a seizure, while higher dimensionality PS-PDFs ($X_3$ and $X_4$) are more sensitive as seizure predictors. This example is one of ten EEG datasets that have been analyzed with similar success.

EXAMPLE II

Results for Drilling Data

This example began with one channel (15 seconds) of current data from one phase of a three-phase spindle motor during drilling of cast iron. The spindle speed was 29.2 revolutions per second with a feed rate of 0.3556 millimeters per revolution. The data were low-pass filtered with a cutoff frequency of 20 kilohertz, and sampled at 60 kilohertz. Twenty datasets were acquired for five successive cuts by 16.669 millimeter diameter carbide-tipped, titanium nitride coated, drill bits in four different conditions: reground new design, worn new design, damaged new design, and worn old design. Low-frequency variations at 220 hertz were removed with a zero-phase, quadratic filtering method, leaving a chaotic signal for subsequent analysis.

Figure 2:
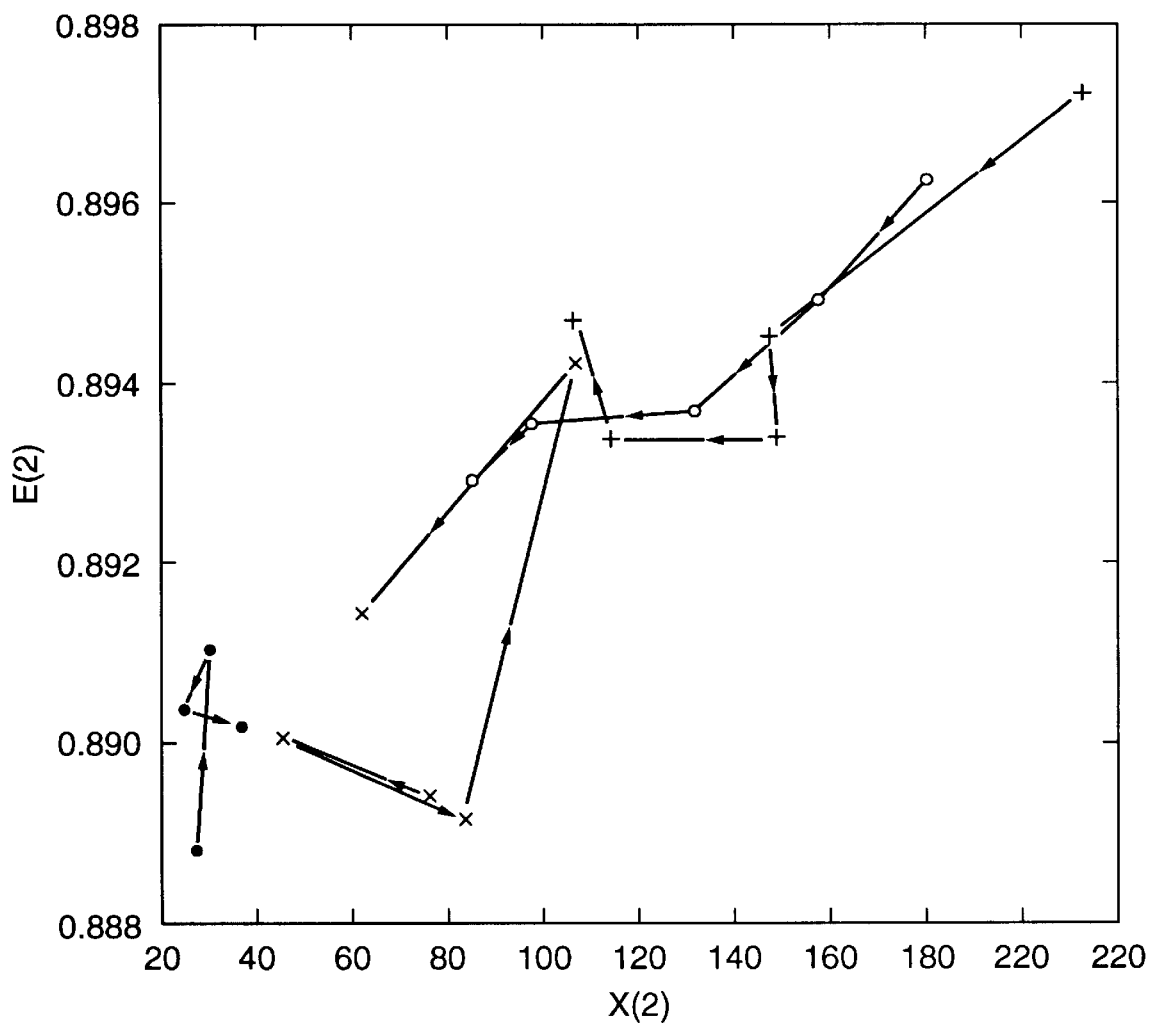
FIG. 2 is a two-dimensional condition comparison ($e_2$ versus $X_2$) for drilling data, with the following symbol meanings: solid dots (●) for reground new design drilling, open circles (○) for worn new design drilling, "x" for damaged new design drilling, and plus signs (+) for worn old design drilling.
Figure 3:
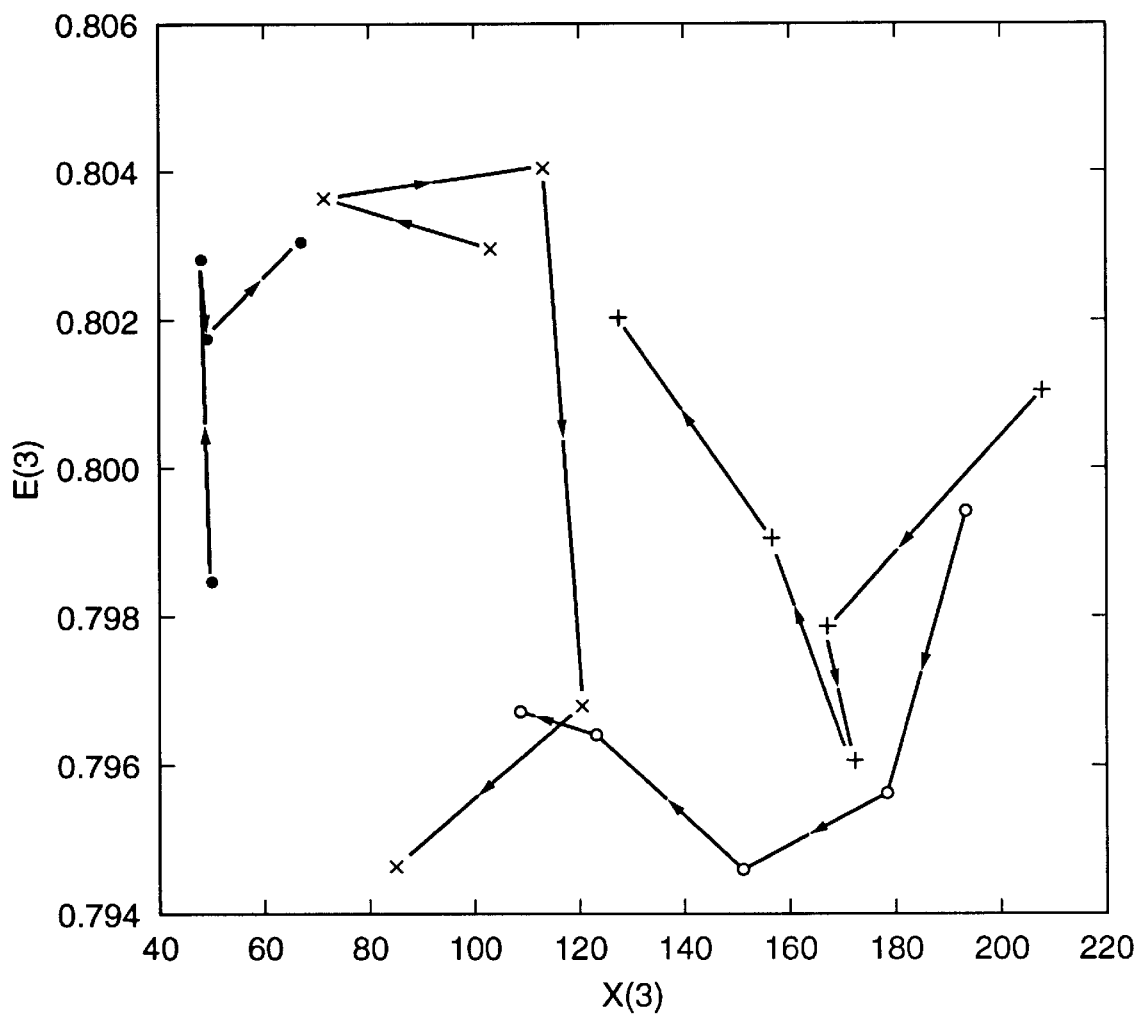
FIG. 3 is a three-dimensional condition comparison ($e_3$ versus $X_3$) for drilling data, with the following symbol meanings: solid dots (●) for reground new design drilling, open circles (○) for worn new design drilling, "x" for damaged new design drilling, and plus signs (+) for worn old design drilling.
Figure 4:
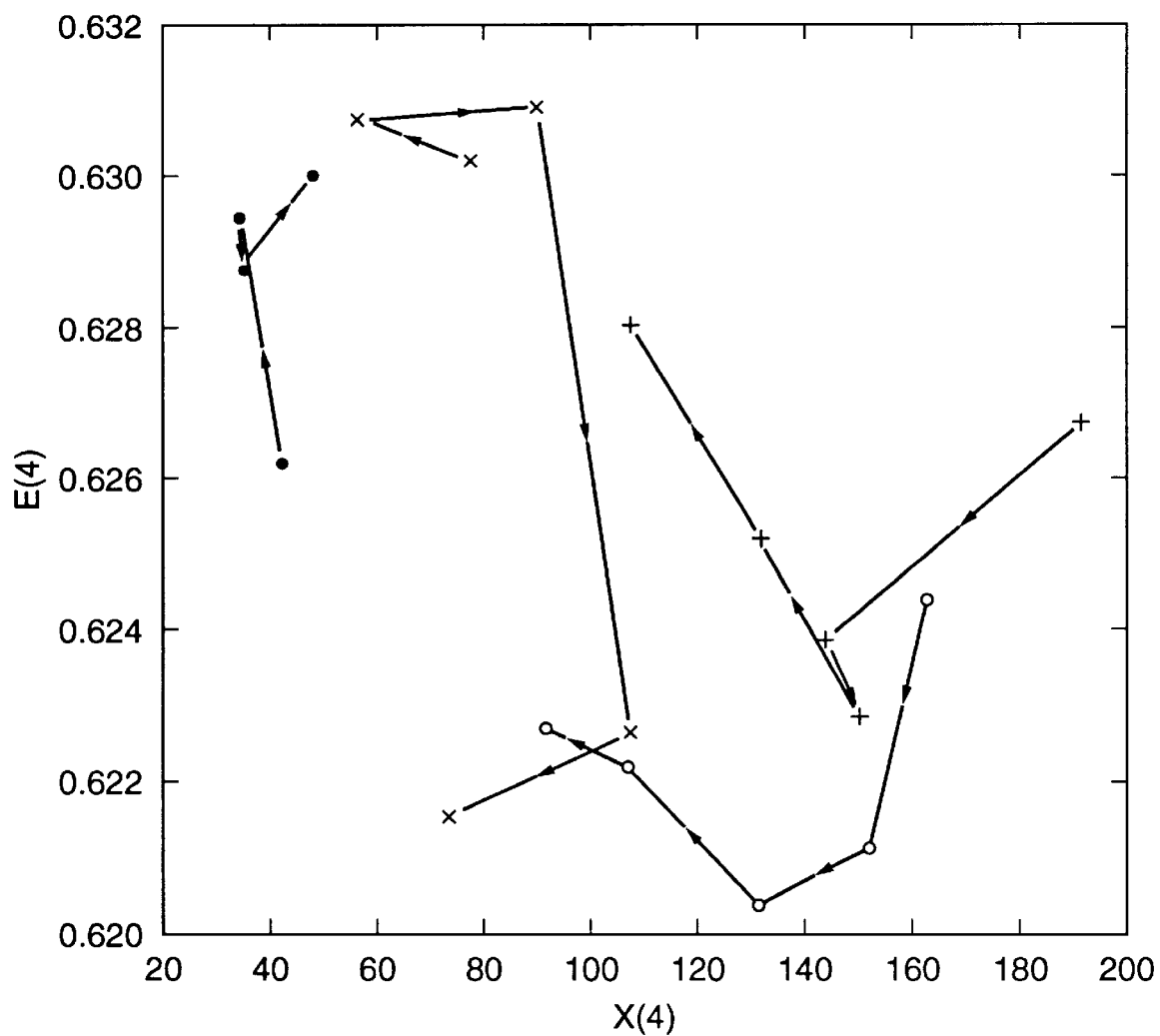
FIG. 4 is a four-dimensional condition comparison ($e_4$ versus $X_4$) for drilling data, with the following symbol meanings: solid dots (●) for reground new design drilling, open circles (○) for worn new design drilling, "x" for damaged new design drilling, and plus signs (+) for worn old design drilling.

The first cut by the reground new design drill bit was used as the base case. Application of the PS-PDF methodology to these datasets yielded a sequence of points, $(X_i, e_i)$, as shown in FIGS. 2–4. The sequence of cuts for each drill bit condition have the following symbol designations: solid dots (●) for reground new design drilling, open circles (○) for worn new design drilling, 'x' for damaged new design drilling, and plus signs (+) for worn old design drilling. Lines connect the points for each bit condition, with arrows indicating the progression of drilling cuts during the experiment. FIG. 2 shows a clear pattern through each cutting sequence in the $(X_2, e_2)$ parameter space. The data for the reground new design forms a distinct cluster in the lower left corner of FIG. 2, but point clusters for the other bit conditions are intermingled. FIG. 3 displays the results for ($X_3$, $e_3$), distinguishing among the four bit conditions, except for overlap between worn new design and damaged new design drilling. FIG. 4 for ($X_4$, $e_4$) is very similar to FIG. 3, showing little discrimination improvement by using a four-dimensional PS-PDF. Thus, FIG. 3 indicates that three-dimensional PS-PDF measures are sufficient to distinguish dynamics for successive drilling cuts, and to monitor different drill bit conditions.

EXAMPLE III

Results for Pump Power Data

This example began with one channel of total electrical power to a three-phase, two-pole motor, directly driving a five-vane centrifugal pump at 58.5 revolutions per second. The power data typically varied between 3,500–5,800 watts, spanning 14 seconds at a sampling rate of 5 kilohertz (a total of 70,000 data points). The two datasets were for mechanically balanced and unbalanced conditions.

Figure 5:
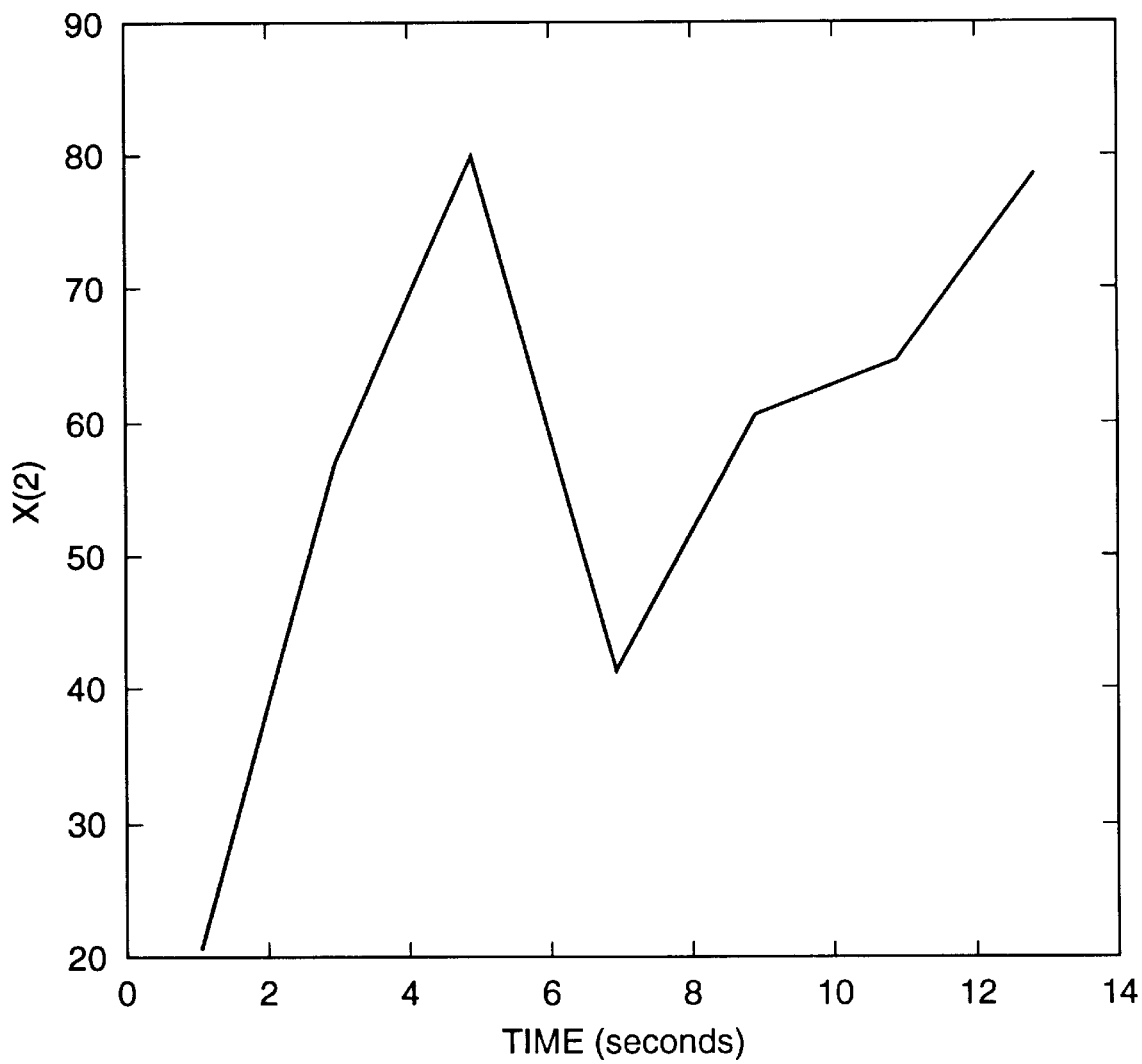
FIG. 5 is a two-dimensional condition comparison ($X_2$ versus time) of mechanically balanced and unbalanced pump conditions from motor power data, showing more than twenty standard deviations difference from the mean of a gaussian probability distribution. This result is a clear indication of significant difference in the dynamics of the two pump states.
Figure 6:
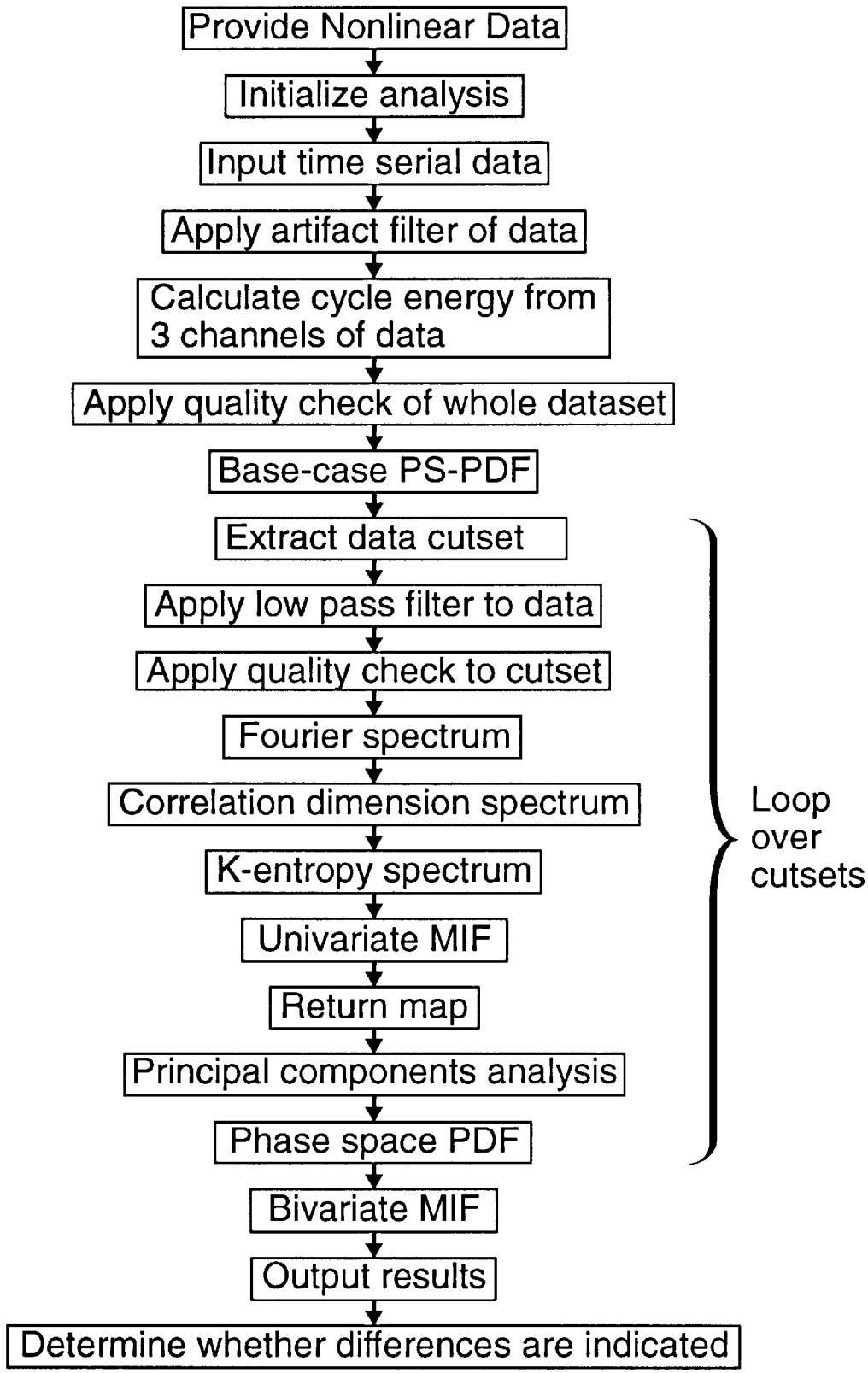
FIG. 6 is a flow chart which describes the steps and indicates the sequence of steps in one embodiment of the method of the present invention.

Both datasets were divided into seven 10,000-point non-overlapping cutsets for seven separate condition comparisons. The above methodology was used with the i-th cutset for the balanced state as the base case, and the i-th cutset for the unbalanced state as the corresponding unknown. The phase-space topology forms a double loop for all of the cutsets, with slightly different gaps for the two conditions. FIG. 5 shows that $X_2$ is >20 throughout the comparison. This result indicates a very significant difference between the datasets, equivalent to more than twenty standard deviations from the mean of a gaussian distribution.

HASHING

In addition, hashing (a well-known computer science technique for searching) improves the phase-space PDF method. A good reference for the hashing technique is *The Art of Programming Vol 3: Sorting and Searching*, by Donald E. Knuth, (published by Addison-Wesley in 1973). Each bin in a multi-dimensional PDF has a set of indices. A key is generated from the set of indices (known as hashing), allowing the occupied bins to be classified. Occupied bins with different sets of indices may have the same key, in which case they belong to the same class known as collisions. The occupied bins from the same class are represented by a linked list, which is well-known to the skilled artisan as a technique for storing data in computers. By careful choice of hashing, the number of occupied bins with the identical keys is small. This approach provides an efficient way to search for the existence of a specific bin. The typical number of data points n (10,000–200,000) gives an upper bound on the number of occupied bins, and in turn, allows one to estimate the amount of space required by the hashing technique. Specifically, the hashing technique requires at most [n (d+3)] elements, where d is the dimensionality of the PDF. The conventional storage scheme for a d-dimensional array requires $N^d$ elements, which translates to over 6 million elements for N=50, d=4, and n=102,400, using the conventional storage scheme for a single 4-dimensional array. On the other hand, the hashing technique requires less than 0.75 million elements, a reduction by a factor of almost 9. For the 5-dimensional PDF, the hashing technique requires only about 0.82 million elements, corresponding to a reduction factor of more than 380 over the conventional storage scheme. The memory reduction factor for a 6-dimensional array is 16,954.

The use of hashing not only reduces the data storage requirements, but also improves the computation speed. The hashing technique decreased execution time by a factor of 31 in the 4-dimensional PDF (including construction of and operations on the PDF) from 1,791 seconds to 58 seconds on a Sun Sparc workstation. Inclusion of the 5-dimensional PDF increased the execution time to 67 seconds, which is very modest. Thus the hashing approach makes higher dimensional PDF calculations both feasible and practical. No prior art is known that uses hashing to reduce the array storage requirements for large multi-dimensional arrays in PDF calculations. Among the advantages of this invention are: novel application of hashing to decrease computer memory requirements for large, sparse, multi-dimensional arrays; and faster execution speed using the hashing technique for array storage.

These features enable higher-dimensional PDF calculations on modest computers, that would otherwise require array storage that is available only on the world's largest, high-performance computers. An increase in dimensionality of the PDF arrays (e.g., from 5- to 6-dimensional) raises the array storage requirements to values that exceed even the memory on world's largest, high-performance computers. Use of hashing in these cases allows the PDF calculations on modest workstation class computers to be performed. Moreover, this hashing approach is generally applicable to storage of sparse, high-dimensional arrays, which is an increasing important problem for multi-dimensional computational simulations (e.g., three dimensions in coordinate space and three dimensions in velocity space).

THE STEPS OF A PREFERRED EMBODIMENT OF THE INVENTION

The automated steps in the integrated methodology are summarized as follows:

(Step 1) Obtain input data for subsequent analysis, including which of the below analyses to (or not to) perform;

(Step 2) Select an appropriate sequence of time serial data values ($x_i$), taken at equal time intervals ($t_i$);

(Step 3) Compute linear statistical measures for the data as a quality check, and terminate the analysis if the data is of inadequate quality, according to the below warnings;

(Step 4) Apply the zero-phase, quadratic filter to the data, thus decomposing the signal into a low-frequency (artifact) and a separate artifact-free signal for subsequent analysis;

(Step 5) Apply the standard fourth-order, low-pass filter to the data from (Step 4);

(Step 6) For three channels of orthogonal acceleration data (a), integrate a with respect to time to obtain velocity (v), from which the vector dot product of velocity and acceleration yields power ($p = P/m = a \cdot v$ for a component mass, m) for subsequent analysis. It must be noted that experimental processes show a systematic decrease in the oscillatory signal for p, indicative of dissipation in the process. This systematic change is removed via application of the zero-phase, quadratic artifact filter;

(Step 7) Integrate the power (p) from (Step 6) with respect to time to obtain the net energy ($E_i$) for each complete power cycle, as defined by either (a) two successive zero crossings in p going from positive-to-negative power (negative-starting energy, $E_i^-$), or (b) two successive zero crossings in p going from negative-to-positive power (positive-starting energy, $E_i^+$);

(Step 8) Use data from (Step 7) to compute the period-n return map for $E_i^-$ and $E_i^+$;

(Step 9) Select a portion of the dataset as a base case from the results from (Step 4),(Step 5), or (Step 7), as appropriate, obtain linear statistics, compute the first minimum ($M_i$) in the mutual information function (MIF), from which the base case phase-space probability density function is then calculated;

(Step 10) Select sequential subsets from the original data (cutsets of 10,000 or more data points);

(Step 11) Obtain linear statistical measures for this cutset, including the minimum ($x_n$), maximum ($x_x$), average ($x$), standard deviation ($\sigma$), absolute average deviation (a), skewness (s), kurtosis (k), and average number of timesteps per cycle ($T_c$);

(Step 12) Compute the univariate mutual information function for the cutset, and find the location of the first minimum ($M_1$) in the mutual information;

(Step 13) Compute the Fourier power spectral density for the cutset, and determine the frequency of the first ($f_1$) and second ($f_2$) largest peaks in the spectrum;

(Step 14) Obtain the correlation dimension spectrum for the cutset;

(Step 15) Calculate the Kolmogorov entropy spectrum for the cutset;

(Step 16) Perform principal components analysis on the cutset data;

(Step 17) Compute the phase-space PDF for the cutset, and obtain the corresponding $\chi^2$ difference between the PDFs for the cutset and the base-case;

(Step 18) Compare linear statistics from (Step 3) to that from all of the cutsets (step 11) as a further data quality check;

(Step 19) Compute the bivariate mutual information function for the entire dataset of all combinations of multi-channel data;

(Step 20) Save the analysis results from the previous steps;

(Step 21) Use specific quantitative criteria, (e.g., level crossings, warning messages) to display diagnostic and prognostic output.

Many of these steps are standard applications of computational methods, as one skilled in the art can appreciate. However, the novelty rests in the unique interaction among those computational components. Previously, each step was a distinct, research-class FORTRAN implementation. In the present embodiment, these steps are integrated into a single automated methodology, which uses results from the previous step for subsequent processing, as outlined above. The various steps use results from the preceding analysis as follows:

| This step | Requires these results from previous analyses |
|---|---|
| Fourier power spectrum | $\underline{x}$ and $\sigma^2$ from linear statistics |
| mutual information functions | $\sigma$, $x_n$, and $x_x$ from linear statistics |
| phase-space PDF | $M_1$ from the univariate mutual information function |
| $\chi^2$ comparison of PD-PDFs | PS-PDFs for base case and cutset |
| correlation dimension spectrum | a and $T_c$ from linear statistics |
| | $f_1$ from the Fourier power spectral density |
| Kolmogorov entropy spectrum | a and $T_c$ from linear statistics |
| | $f_1$ from the Fourier power spectral density |
| Principal components analysis | $\underline{x}$ from linear statistics |
| | $M_1$ from the univariate mutual information function |
| Data quality check | $\underline{x}$, a, $\sigma$, $x_n$, $x_x$, s, k, and $T_c$ from linear statistics |
| | $f_1$ and $f_2$ from the Fourier power spectral density |

The data quality check consists of the following calculations:

(step i) Determine the number of bits of active precision in the data by the maximum entropy method. Namely, the range of variation in the data ($x_n \leq x_i \leq x_x$) is divided into $M=2^m$ equally spaced bins. Each data value ($x_j$) is assigned to one such bin according to the formula, J=INT $[M(x_j-x_n)/(x_x-x_n)+1]$, where INT( . . . ) coverts a real number to the next smaller integer [e.g., INT(3.14)=3]. A one-dimensional probability density (D) function is constructed by incrementing the population of the J-th element, for each data value ($x_j$). The corresponding normalized entropy is:

$$e(m) = -(\ln M)^{-1} \sum_{j=1}^{M} d_j \ln d_j \quad \text{(Eq. 7)}$$

where $d_j$ is the normalized probability density, $d_j=D_j/M$. The entropy, e(m) is found for successively larger integer values of $m \leq 16$, from which the maximum in e(m) is obtained, corresponding to the number of active bits (B) of data precision. If B<5, issue a warning.

(step ii) Determine the apparent data precision via the formula, $b=\log_2[(x_x-x_n)/\Delta x_s]$, where $\Delta x_s$ is the magnitude of the smallest difference between any two values of $x_i$ and is 1 for integer data;

(step iii) Compute the first difference, $\Delta x_i = x_{i+1} - x_i$ for the entire dataset, and obtain the minimum ($\Delta x_n$) and maximum ($\Delta x_x$) value of $\Delta x_i$.

If $\Delta x_n > 0$ over the whole dataset, issue a warning that the signal is only increasing;

If $\Delta x_x < 0$ over the whole dataset, issue a warning that the signal is only decreasing;

If $|\Delta x_n| > (x_x - x_n)/2$, issue a warning that excessively large negative shifts occur;

If $|x_x| > (x_x - x_n)/2$, issue a warning that excessively large positive shifts occur;

Then, discretize the $\Delta x_i$ data via the formula, J=INT[M $(\Delta x_j - \Delta x_n)/(\Delta x_x - \Delta x_n)+1]$ and compute a one-dimension PDF as in calculation i), where M is smaller of the following two quantities: IFIX$[(\Delta x_j - \Delta x_n)/\Delta x_s+1]$ and $2^B$. Determine the bin with the largest population ($N_x$). Check the population of other bins in the fringes of the distribution function, that is when $J \leq 0.1M$ or $J \geq 0.9M$. If the signal is not strongly periodic (i.e., the power in the Fourier spectral peaks corresponding to $f_f$ and $f_2$ is less than half of the total spectral power), then if the population in any one fringe bin is excessive ($\geq N_x/10$), issue a warning.

Also, determine the PDF bin index ($J_0$) that corresponds to $\Delta x_i=0$, and check the bin populations for $J \leq J_0-M/5$ and $J \geq J_0+M/5$. If the signal is not strongly periodic (i.e., the power in the Fourier spectral peaks corresponding to $f_1$ and $f_2$ is less than half of the total spectral power), then if the population in any one outer bin is excessive ($\geq N_x/10$), issue a warning.

(step iv) Use the one-dimensional PDF ($P_1$) constructed in step i, corresponding to the active number of bits of data precision (B) from step i, as the base case. Use the same method as in step i to construct a one-dimensional PDF for each cutset ($Q_1$). The occurrence frequency in each bin of $P_1$ is scaled so that the total population (sum of all $P_1$ bins) is the same as the total population of $Q_1$. Namely, each bin of $P_1$ is scaled $cP_1$ by the factor c=(total population of $Q_1$)/(total population of $P_1$). Then $P_1$ and $Q_1$ are compared by a $\chi^2$ statistic:

$$\chi^2 = \sum_{i=1}^{N} (Q_1(i) - P_1(i))^2/P_1(i) + (Q_{1s} - P_{1s})^2/P_{1s} \quad \text{(Eq. 8)}$$

The first term in (Eq. 8) is used if $P_1(i)>10$. If $P_1(i) \leq 10$, then the sparse bins are pooled into one (or more) accumulation bins(s) and compared by the second term in (Eq. 8). As before, the resulting $\chi_1^2$ measure is scaled to a normal distribution by $X_1=(\chi^2-v)/(2v)^{1/2}$, with v=number of non-empty $P_1$ bins in (Eq. 8) minus one. Issue a warning if $X_1>100$.

(step v) Warn of an inadequate sampling rate if $T_c$ (for whole dataset)<5 timesteps/cycle;

(step vi) Issue a warning if the total number of data points is <10,000.

As is obvious to one skilled in the art, the $\chi^2$ comparison can also be applied to multi-dimensional PDFs that are constructed from other nonlinear measures. One such application is principal components analysis, which reconstructs the nonlinear dynamics from experimental data. Abarbanel et al. (7) and Grassberger et al. (8) review this and related techniques. A sequence of data ($x_i$) is measured at equal intervals ($\tau$), beginning at some initial time ($t_0$), $x_i=x(t_0+i\tau)$. Conversion of this data to a system of differential equations for the dynamics requires that the derivatives be approximated by finite differences of the data values [dx/dt=($x_{i+1}-x_i$)/$\tau$, $d^2x/dt^2=(x_{i+2}-2x_{i+1}-x_i)/\tau^2$, etc.]. These and higher derivatives use the information that a resides in the $x_i$ data, as multiples of other measurements at times that are multiples of the observation interval ($\tau$). A more direct method (9) uses lagged variables, $x_{n+i\lambda}=x(t_0+(n+i\lambda)\tau)$, with $\lambda$ as an integer lag that is determined from the data. In particular, this method creates a vector of data in d dimensions:

$$y(n)=[x_n, x_{n+\lambda}, x_{n+2\lambda}, \ldots, x_{n+(d-1)\lambda}]$$

Takens (10) found that faithful reconstruction of the system dynamics requires the embedding dimension (d) to be at least one plus twice the number of degrees of freedom (DOF). We measure the DOF for a given scale length as the correlation dimension (D), yielding an embedding dimension of d>2D+1. If the lag value is too small, then adjacent coordinates, $X_{n+j\lambda}$ and $x_{n+(j+1)\lambda}$, will be so close together in numerical value that they cannot be distinguished. If the lag value is too large, then these same adjacent coordinates are essentially independent due to the inherent unpredictability of nonlinear or chaotic systems after a long time. An optimal time length (2) should span enough data to go from the first maximum in the univariate MIF (maximum nonlinear correlation that always occurs at zero lag) to the first minimum in the MIF (minimum nonlinear correlation at $M_1$ as measured in timesteps). The vector in the last equation has a total of (d-1) $\lambda$timesteps, so the lag value is obtained from $M_1=(d-1)\lambda \geq (2D+1-1)\lambda=2D\lambda$, or $1 \leq \lambda \leq M_1/2D$. When these constraints are satisfied, Takens' embedding theorem (10) guarantees that the resulting representation faithfully reconstructs the system dynamics. Broomhead and King (11) obtained the eigenvalues ($\sigma_i$) of the covariance matrix of y(n), which are all positive and can be ordered monotonically from largest to smallest. The larger eigenvalues correspond to the true system dynamics in $d_T$ dimensions and typically constitute $\geq 99\%$ of the sum over all the eigenvalues. Other eigenvalues arise from noise in $d_N$ dimensions with $d=d_T+d_N$, corresponding to a noise floor in $\sigma_i$ versus i. The eigenvectors are orthogonal and are used to project out the independent dynamic components from the data, e.g., $Z_k(i)$ as the k-th dynamic component at the i-th timestep. The "principal components" match the larger eigenvalues. The system dynamics are converted to two- or three-dimensions by connecting the sequence of points ($z_1(i), z_2(i)$) for the first two principal components, or by connecting the triplet ($z_1(i), Z_2(i), Z_3(i)$) for the first three principal components. Thus, as is apparent to one skilled in the art, the PDF that is constructed from principal components analysis can be used in the same way as the phase-space PDF for $\chi^2$ comparisons as a condition change monitor.

Return map analysis is another form of nonlinear analysis to which $\chi^2$ comparisons can also be applied for multi-dimensional PDFs. For example, we can analyze the cycle-to-cycle energy from the positive- and negative-starting power (p), respectively, yielding $E_i^+$ or $E_i^-$ as a measure that characterizes the i-th cycle, or event. Evaluation of the time-serial power produces two, discrete sequences, $\{E_1^+, E_2^+, \ldots, E_n^+\}$ and $\{E_1^-, E_2^-, \ldots, E_n^-\}$. These sequences move from one unstable periodicity to another in recurring patterns that are driven by the nonlinearity in the component dynamics. We extract these patterns in a "return map" by analyzing the energies in pairs ($E_{i+m}$ versus $E_i$). Points near the diagonal, $E_{i+m}=E_i$, correspond to period-m motion because this location is visited every m-th cycle. Such points are also "unstable" because the system does not remain there, and "fixed" because the period-m location(s) do not change during repeated visits. Chaotic systems have an infinite number of unstable, periodic, fixed points. Moreover, stable and unstable directions span the region near an unstable fixed point in the shape of a multi-dimensional saddle. Return-map points approach an unstable fixed point along a locally-linear "stable" direction (or manifold), like a ball rolling stably toward the center of a saddle. Return-map points depart from an unstable fixed point along a locally linear "unstable" direction (or manifold), like a ball rolling rapidly off the side of a saddle. The distance between the fixed point and successive departing points increases exponentially, displaying sensitivity to initial conditions which is the hallmark of chaos. Characterization of this topology requires analysis of the data for multiple approaches to and departures from the same fixed point along the same directions. As is obvious to one skilled in the art, the construction of such a return map in three-dimensions involves points ($E_i$, $E_{i+m}$, $E_{i+2m}$), and ($E_i$, $E_{i+m}$, . . . , $E_{i+m(d-1)}$) in d dimensions. A sample of such d-dimension points constructs a probability density function using the same approach as above for the phase-space PDF and the principal components PDF. The physical meaning of the PDF is the same in all three instances: an n-dimensional topological representation of the nonlinear dynamics, which can subsequently be used for condition monitoring via the $\chi^2$ method.

Possible alternative applications for this invention include: software algorithm on appropriate computers and hardware implementation of the same methodology, such as algorithm on a custom chip or on a digital signal processor.

While there has been shown and described what are at present considered the preferred embodiments of the invention, it will be obvious to those skilled in the art that various changes and modifications can be made therein without departing from the scope of the inventions defined by the appended claims.

We claim:

1. A method for automatically discriminating between similar but different states in a nonlinear process comprising the steps of:
   (A) Operating a data provision means selected from the group consisting of data storage means and data acquisition means to provide at least one channel of nonlinear data, called e-data;
   (B) Separating the e-data into artifact data, called f-data, and artifact-free data, called g-data, while preventing phase distortions in the data;
   (C) Processing g-data through a filter to produce a filtered version of g-data, called h-data;
   (D) Applying at least one nonlinear measure to at least one type of data selected from the group consisting of e-data, f-data, g-data, and h-data to provide at least one time serial sequence of nonlinear measures from which at least one indicative trend selected from the group consisting of abrupt increases and abrupt decreases can be determined;
   (E) Comparing at least one indicative trend with at least one known discriminating indicator;
   (F) Determining from said comparison whether differences between similar but different states are indicated; and
   (G) Providing notification whether differences between similar but different states are indicated, Said steps B, C, D, E, and F being accomplishable in one integrated sequence of computer analyses.

2. The method as described in claim 1 wherein said at least one time serial sequence of nonlinear measures is selected from the group consisting of: time per wave cycle for e-data, time per wave cycle for f-data, time per wave cycle for g-data, time per wave cycle for h-data, Kolmogorov entropy for e-data, Kolmogorov entropy for f-data, Kolmogorov entropy for g-data, Kolmogorov entropy for h-data, first minimum in the mutual information function for e-data, first minimum in the mutual information function for f-data, first minimum in the mutual information function for g-data, first minimum in the mutual information function for h-data, correlation dimension for e-data, correlation dimension for f-data, correlation dimension for g-data, correlation dimension for h-data, and combinations thereof.

3. The method as described in claim 1 wherein the e-data is separated into f-data and g-data by use of a zero-phase filter.

4. The method as described in claim 1 wherein the filter comprises a standard low-pass filter selected from the group consisting of second-order, third-order, and fourth-order low-pass filters at frequencies between about 35 Hz and about 60 Hz.

5. The method as described in claim 4 wherein the low-pass filter is a standard fourth-order low-pass filter at about 50 Hz.

6. Apparatus for automatically discriminating between similar but different states in a nonlinear process comprising:
   (A) Data provision means for providing at least one channel of nonlinear data, called e-data, said data provision means being selected from the group consisting of data storage means and data acquisition means;
   (B) Separation means for separating the e-data into artifact data, called f-data, and artifact-free data, called g-data, while preventing phase distortions in the data, communicably connected to said data provision means;
   (C) Filter means for filtering g-data to produce a filtered version of g-data, called h-data, communicably connected to said separation means;
   (D) Application means for applying at least one nonlinear measure to at least one type of data selected from the group consisting of e-data, f-data, g-data, and h-data to provide at least one time serial sequence of nonlinear measures, from which at least one indicative trend selected from the group consisting of abrupt increases and abrupt decreases can be determined, communicably connected to said filter means;
   (E) Comparison means for comparing at least one indicative trend with at least one known discriminating indicator, communicably connected to said application means;

(F) Determination means for determining from said comparison whether differences between similar but different states are indicated, communicably connected to said comparison means; and (G) Notification means for providing notification whether differences between similar but different states are indicated, communicably connected to said determination means, Said elements B, C, D, E, and F being operable in one integrated sequence of computer analyses.

7. The apparatus as described in claim 6 wherein said at least one time serial sequence of nonlinear measures is selected from the group consisting of: time per wave cycle for e-data, time per wave cycle for f-data, time per wave cycle for g-data, time per wave cycle for h-data, Kolmogorov entropy for e-data, Kolmogorov entropy for f-data, Kolmogorov entropy for g-data, Kolmogorov entropy for h-data, first minimum in the mutual information function for e-data, first minimum in the mutual information function for f-data, first minimum in the mutual information function for g-data, first minimum in the mutual information function for h-data, correlation dimension for e-data, correlation dimension for f-data, correlation dimension for g-data, correlation dimension for h-data, and combinations thereof.

8. The apparatus as described in claim 6 wherein the e-data is separated into f-data and g-data by use of a zero-phase filter.

9. The apparatus as described in claim 8 wherein said filter means comprises a standard low-pass filter selected from the group consisting of second-order, third-order, and fourth-order low-pass filters at frequencies between about 35 Hz and about 60 Hz.

10. The apparatus as described in claim 9 wherein said low-pass filter is a standard fourth-order low-pass filter at about 50 Hz.

11. A method for automatically discriminating between similar but different states in a nonlinear process comprising the steps of:

(A) Operating a data provision means selected from the group consisting of data storage means and data acquisition means to provide at least one channel of nonlinear data, called e-data;

(B) Separating the e-data into artifact data, called f-data, and artifact-free data, called g-data, while preventing phase distortions in the data;

(C) Processing g-data through a filter to produce a filtered version of g-data, called h-data;

(D) Applying the lag derived from the first minimum in the mutual information function to create a d-dimensional probability density function which forms a high-dimensional topology for at least one type of data selected from the group consisting of e-data, f-data, g-data, and h-data whereby at least one indicative trend can be determined;

(E) Comparing at least one indicative trend with at least one known discriminating indicator;

(F) Determining from said comparison whether differences between similar but different states are indicated; and (G) Providing notification whether differences between similar but different states are indicated, Steps B, C, D, E, and F being accomplishable in one integrated sequence of computer analyses.

12. The method as described in claim 11 wherein the e-data is separated into f-data and g-data by use of a zero-phase filter.

13. The method as described in claim 12 wherein the filter comprises a standard low-pass filter selected from the group consisting of second-order, third-order, and fourth-order low-pass filters at frequencies between about 35 Hz and about 60 Hz.

14. The method as described in claim 13 wherein the low-pass filter is a standard fourth-order low-pass filter at about 50 Hz.

15. A method for automatically discriminating between similar but different states in a nonlinear process comprising the steps of:

(A) Operating a data provision means selected from the group consisting of data storage means and data acquisition means to provide at least one channel of nonlinear data, called e-data;

(B) Separating the e-data into artifact data, called f-data, and artifact-free data, called g-data, while preventing phase distortions in the data;

(C) Processing g-data through a filter to produce a filtered version of g-data, called h-data;

(D) Applying the lag derived from the first minimum in the mutual information function to create a d-dimensional probability density function which forms a high-dimensional topology for at least one type of data selected from the group consisting of e-data, f-data, g-data, and h-data whereby at least one indicative trend can be determined;

(E) Generating a key from the set of indices of each bin in the multidimensional probability density function;

(F) Representing occupied bins from the same class by a linked list to provide a reduction in the number of elements to be stored in the manner known as hashing whereby at least one hashed discriminating trend can be determined;

(G) Comparing at least one indicative trend with at least one known discriminating indicator;

(H) Determining from said comparison whether differences between similar but different states are indicated; and (I) Providing notification whether differences between similar but different states are indicated, Said discriminating indicator being hashed, and Steps B, C, D, E, F, G, and H being accomplishable in one integrated sequence of computer analyses.

16. An apparatus for automatically discriminating between similar but different states in a nonlinear process comprising:

(A) Data provision means for providing at least one channel of nonlinear data, called e-data, said data provision means being selected from the group consisting of data storage means and data acquisition means;

(B) Separation means for separating the e-data into artifact data, called f-data, and artifact-free data, called g-data, while preventing phase distortions in the data, communicably connected to said data provision means;

(C) Filter means for filtering g-data to produce a filtered version of g-data, called h-data, communicably connected to said separation means;

(D) Application means for applying the lag derived from the first minimum in the mutual information function to create a d-dimensional probability density function which forms a high-dimensional topology for at least one type of data selected from the group consisting of e-data, f-data, g-data, and h-data whereby at least one indicative trend can be determined, communicably connected to said filter means;

(E) Comparison means for comparing at least one indicative trend with at least one known discriminating indicator, communicably connected to said application means;

(F) Determination means for determining from the comparison whether differences between similar but different states are indicated, communicably connected to said comparison means; and (G) Notification means for providing notification whether differences between similar but different states are indicated, communicably connected to said determination means, Said discriminating indicator being hashed and said elements B, C, D, E, and F being operable in one integrated sequence of computer analyses.

17. The apparatus as described in claim 16 wherein the e-data is separated into f-data and g-data by use of a zero-phase filter.

18. The apparatus as described in claim 17 wherein the filter means comprises a standard low-pass filter selected from the group consisting of second-order, third-order, and fourth-order low-pass filters at frequencies between about 35 Hz and about 60 Hz.

19. The apparatus as described in claim 18 wherein the low-pass filter is a standard fourth-order low-pass filter at about 50 Hz.

20. An apparatus for automatically discriminating between similar but different states in a nonlinear process comprising:

(A) Data provision means for providing at least one channel of nonlinear data, called e-data, said data provision means being selected from the group consisting of data storage means and data acquisition means;

(B) Separation means for separating the e-data into artifact data, called f-data, and artifact-free data, called g-data, while preventing phase distortions in the data, communicably connected to said data provision means;

(C) Filter means for filtering g-data to produce a filtered version of g-data, called h-data, communicably connected to said separation means;

(D) Application means for applying the lag derived from the first minimum in the mutual information function to create a d-dimensional probability density function which forms a high-dimensional topology for at least one type of data selected from the group consisting of e-data, f-data, g-data, and h-data whereby at least one indicative trend can be determined, communicably connected to said filter means;

(E) Generation means for generating a key from the set of indices of each bin in the multidimensional probability density function, communicably connected to said application means;

(F) Representation means for representing occupied bins from the same class by a linked list to provide a reduction in the number of elements to be stored in the manner known as hashing, whereby at least one hashed indicative trend can be determined, communicably connected to said generation means;

(G) Comparison means for comparing at least one indicative trend with at least one known discriminating indicator, communicably connected to said representation means;

(H) Determination means for determining from said comparison whether differences between similar but different states are indicated, communicably connected to said comparison means; and (I) Notification means for providing notification whether differences between similar but different states are indicated, communicably connected to said determination means, Said discriminating indicator being hashed, and Elements B, C, D, E, F, G, and H being operable in one integrated sequence of computer analyses.

* * * * *